United States Patent [19]
Scarmalis

[11] Patent Number: 6,134,245
[45] Date of Patent: Oct. 17, 2000

[54] SYSTEM AND METHOD FOR THE COMPRESSION AND TRANSPORTATION OF NON FRAME RELAY DATA OVER A FRAME RELAY NETWORK

[75] Inventor: John Scarmalis, St. Petersburg, Fla.

[73] Assignee: Paradyne Corporation, Largo, Fla.

[21] Appl. No.: 09/004,896

[22] Filed: Jan. 9, 1998

Related U.S. Application Data

[60] Provisional application No. 60/055,048, Aug. 8, 1997.

[51] Int. Cl.[7] .................................................. H04J 3/24
[52] U.S. Cl. ............................................ 370/474; 370/477
[58] Field of Search ..................................... 370/473, 474, 370/476, 477

[56] References Cited

U.S. PATENT DOCUMENTS

| | | | |
|---|---|---|---|
| 5,519,640 | 5/1996 | Ganesan et al. | 709/236 |
| 5,812,545 | 9/1998 | Liebowitz et al. | 370/337 |
| 5,974,052 | 10/1999 | Johnson et al. | 370/467 |

OTHER PUBLICATIONS

Comer, Douglas, Internetworking With TLP/IP, pp.: 191–193, 201–204.

*Primary Examiner*—Douglas W. Olms
*Assistant Examiner*—David R. Vincent
*Attorney, Agent, or Firm*—Thomas, Kayden, Horstemeyer & Risley, L.L.P.

[57] ABSTRACT

A system and method for the efficient compression and identification of non frame relay data packets allows the transport of non frame relay data packets over a frame relay network. Generic, non frame relay data is segmented into a plurality of data packets and encapsulated for transparent transport over a frame relay communication network.

32 Claims, 8 Drawing Sheets

SYSTEM AND METHOD FOR THE COMPRESSION AND TRANSPORTATION OF NON FRAME RELAY DATA OVER A FRAME RELAY NETWORK

CROSS REFERENCE TO RELATED APPLICATION

This document claims priority to and the benefit of the filing date of copending and commonly assigned provisional application entitled A METHOD FOR THE COMPRESSION OF NON-FRAME RELAY TRAFFIC OVER FRAME RELAY NETWORK, assigned Ser. No. 60/055,048, and filed Aug. 8, 1997, and is hereby incorporated by reference.

FIELD OF THE INVENTION

The present invention relates generally to data communications, and more particularly, to a system and method for the compression, identification, and transportation of non frame relay data packets over a frame relay communications network.

BACKGROUND OF THE INVENTION

In the field of data communications a modem is used to convey information from one location to another. Digital Subscriber Line (DSL) technology now enables modems, or other devices such as frame relay data service units (DSU's), to communicate rapidly large amounts of data. This communication scheme generally adheres to a model, known as the Open Systems Interconnect (OSI) Seven-Layer model. This model specifies the parameters and conditions under which information is formatted and transferred over a given communications network. A general background of the OSI seven layer model follows.

In 1978, a framework of international standards for computer network architecture known as OSI (Open Systems Interconnect) was developed. The OSI reference model of network architecture consists of seven layers. From the lowest to the highest, the layers are: (1) the physical layer; (2) the datalink layer; (3) the network layer; (4) the transport layer; (5) the session layer; (6) the presentation layer; and (7) the application layer. Each layer uses the layer below it to provide a service to the layer above it. The lower layers are implemented by lower level protocols which define the electrical and physical standards, perform the byte ordering of the data, and govern the transmission and error detection and correction of the bit stream. The higher layers are implemented by higher level protocols which deal with, inter alia, data formatting, terminal-to-computer dialogue, character sets, and sequencing of messages.

Layer 1, the physical layer, controls the direct host-to-host communication between the hardware of the end users' data terminal equipment (e.g., a modem connected to a PC). Layer 2, the datalink layer, generally fragments the data to prepare it to be sent on the physical layer, receives acknowledgment frames, performs error checking, and re-transmits frames which have been incorrectly received.

Layer 3, the network layer, generally controls the routing of packets of data from the sender to the receiver via the datalink layer, and it is used by the transport layer. An example of the network layer is Internet Protocol (IP) which is the network layer for the TCP/IP protocol widely used on Ethernet networks. In contrast to the OSI seven-layer architecture, TCP/IP (Transmission Control Protocol over Internet Protocol) is a five-layer architecture which generally consists of the network layer and the transport layer protocols. The transport layer (Layer 4) determines how the network layer should be used to provide a point-to-point, virtual, error-free connection so that the end point devices send and receive uncorrupted messages in the correct order. This layer establishes and dissolves connections between hosts. It is used by the session layer. TCP is an example of the transport layer.

Layer 5, the session layer, uses the transport layer and is used by the presentation layer. The session layer establishes a connection between processes on different hosts. It handles the creation of sessions between hosts as well as security issues.

Layer 6, the presentation layer, attempts to minimize the noticeability of differences between hosts and performs functions such as text compression and format and code conversion.

Layer 7, the application layer, is used by the presentation layer to provide the user with a localized representation of data, which is independent of the format used on the network. The application layer is concerned with the user's view of the network and generally deals with resource allocation, network transparency and problem partitioning.

The communications networks that operate within the OSI seven later model include a number of paths or links that are interconnected to route voice, video, and data (hereinafter collectively referred to as "data") traffic from one location of the network to another. At each location, an interconnect node couples a plurality of source nodes and destination nodes to the network. In some cases, the sources and destinations are incorporated in a private line network that may include a series of offices connected together by leased-lines with switching facilities and transmission equipment owned and operated by the carrier or service provider and leased to the user. This type of network is conventionally referred to as a circuit-switching network. Accordingly, a source node of one office at one location of the network may transmit data to a destination node of a second office located at another location of the network through their respective switching facilities.

At any given location, a large number of source nodes may desire to communicate through their respective switching facilities, or interconnect node, to destination nodes at various other locations of the network. The data traffic from the various source nodes is first multiplexed through the source switching facility, then demultiplexed at the destination switching facility and finally delivered to the proper destination node. A variety of techniques for efficiently multiplexing data from multiple source nodes onto a single circuit of the network are presently employed in private line networks. For instance, time division multiplexing ("TDM") affords each source node full access to the allotted bandwidth of the circuit for a small amount of time. The circuit is divided into defined time segments, with each segment corresponding to a specific source node, to provide for the transfer of data from those source nodes, when called upon, through the network.

Other data communications systems, in contrast, have not been as successful employing multiplexing techniques to enhance network efficiency further. In particular, frame-relay networks offer far fewer alternatives than their circuit-switching network counterparts. Frame-relay networks are often referred to as packet-switching networks. Packet-switching networks, as opposed to circuit-switching networks, allow multiple users to share data network facilities and bandwidth rather than providing a specific amount of dedicated bandwidth to each user, as in TDM. Instead, packet switches divide bandwidth into connectionless, virtual circuits. As is known, virtual circuit bandwidth is consumed only when data are actually transmitted. Otherwise, the bandwidth is not used. In this way, packet-switching networks essentially mirror the operation of a statistical multiplexer (whereby multiple logical users share a single network access circuit). Frame relay operates within layer 2 (the data link layer) of the OSI model, and is an improvement over previous packet switching techniques, such as X.25, in that frame relay requires significantly less overhead.

Frame relay networks transport data packets by compressing and then transporting the packets over the communications channel. The communications channel can be provided by, for example, an ISDN (Integrated Services Digital Network) connection, however, other physical connections may be employed to transport frame relay data.

Frame relay is one of a series of data link protocols that fall within the broader class of data link protocols known as High-Level Data Link Control (HDLC). Typically, the frame relay data to be compressed and transported is packetized into standard High-Level Data Link Control - Unnumbered Information (HDLC-UI) Frame Relay packets in accordance with the Internet Engineering Task Force (IETF) Request for Comment (RFC) 1490. RFC 1490 defines the format of standard HDLC-UI frame relay packets. These standard packets are then compressed and transported over the frame relay network.

One problem with this system is that current standards are limited to defining methods for compressing and transporting standard frame relay data only. Non frame relay packets, such as generic HDLC data packets, cannot be transported through a frame relay network using these standards. A non frame relay data packet can be any data communications packet that complies with HDLC, but is not a frame relay packet. An example is a Serial Network Architecture/Synchronous Data Link Control (SNA/SDLC) or a Point to Point Protocol (PPP) packet. However, the transport of these non frame relay packets transparently through a frame relay network has been heretofore impossible.

SUMMARY OF THE INVENTION

The present invention provides an improvement to a frame relay communication environment by enabling the compression and transport of non frame relay data over a standard frame relay network.

This task is accomplished by providing a system for efficiently compressing and transporting a non frame relay data packet over a frame relay network using logic configured to segment a generic High Level Data-Link Control (HDLC) packet into a plurality of data segments. These data segments can be of fixed or variable length. The last data segment, i.e., the one that includes the original data frame check sequence (FCS) in the form of a two byte cyclic redundancy check (CRC) frame is included in the last data segment and compressed therewith. A segmentation field is added to each of the data segments in order to permit the accurate reassembly of each decompressed packet into the original generic data frame. Also included is logic configured to compress each of the data segments which are in turn encapsulated with a standard compression header forming a compressed frame relay data packet. In the preferred embodiment, encapsulation is applied in accordance with frame relay forum (FRF) implementation agreement FRF-9, however, any standard encapsulation arrangement can be used without departing from the principles of the present invention. The compressed frame relay data packet is then transported over a frame relay communication network. At a receiving device there is logic configured to receive each compressed data frame relay data packet and remove the encapsulation from each data frame relay data packet. Each received frame relay data packet is then decompressed in accordance with FRF-9 to form a decompressed data segment and reassembled into the original generic data frame.

The present invention also provides a method for the efficient transport of non frame relay data over a frame relay network. The invention provides a method for segmenting a generic data frame into a plurality of data segments. To each data segment is added a segmentation field to ensure the accurate reassembly of the compressed data segments after decompression. Each data segment is then compressed in accordance with FRF-9 data compression for the preferred embodiment, however, any compression protocol can be implemented successfully while employing the benefits of the present invention. The compressed data segments are then encapsulated in accordance with FRF-9 to form a compressed frame relay data packet in the preferred embodiment for transport over the frame relay communication network. At a receiving device the compressed frame relay data packets are received and decompressed in accordance with FRF-9 to form a plurality of decompressed data segments in the preferred embodiment, and reassembled into the original generic data frame.

The invention has numerous advantages, a few of which are delineated hereafter, as merely examples.

An advantage of the present invention is that it provides for a convenient method for transporting non frame relay data over a frame relay network.

Another advantage of the present invention is that it minimizes the amount of overhead required to transport non frame relay data.

Another advantage of the present invention is that the transport of non frame relay data is transparent to the frame relay network.

Another advantage of the present invention is that it is simple in design, reliable in operation, and its design lends itself to economical mass production in frame relay communication devices.

Other features and advantages of the present invention will become apparent to one with skill in the art upon examination of the following drawings and detailed description. It is intended that all such additional features and advantages be included herein within the scope of the present invention, as defined in the appended claims.

BRIEF DESCRIPTION OF THE DRAWINGS

The present invention, as defined in the claims, can be better understood with reference to the following drawings. The components within the drawings are not necessarily to scale relative to each another, emphasis instead being placed on clearly illustrating the principles of the present invention.

DETAILED DESCRIPTION OF THE PREFERRED EMBODIMENT

The non frame relay data transport logic can be implemented in software, hardware, or a combination thereof. In the preferred embodiment, the elements of the non frame relay data transport logic are implemented in software that is stored in a memory and that configures and drives a suitable digital signal processor (DSP) situated in a communications device. The preferred embodiment of the non frame relay data transport logic is an algorithm that is executed on a DSP. However, the foregoing software can be stored on any computer-readable medium for transport or for use by or in connection with any suitable computer-related system or method. In the context of this document, a computer-readable medium is an electronic, magnetic, optical, or other physical device or means that can contain or store a computer program for use by or in connection with a computer-related system or method. Furthermore, the preferred embodiment of the non frame relay data transport logic is illustrated in the context of a frame relay communications network, however, the concepts and principles of the present invention are equally applicable to other communication techniques where the transport of packetized information is provided for. Additionally, frame relay is typically accomplished over an integrated services digital network (ISDN) and will be discussed herein in that context.

Figure 1:
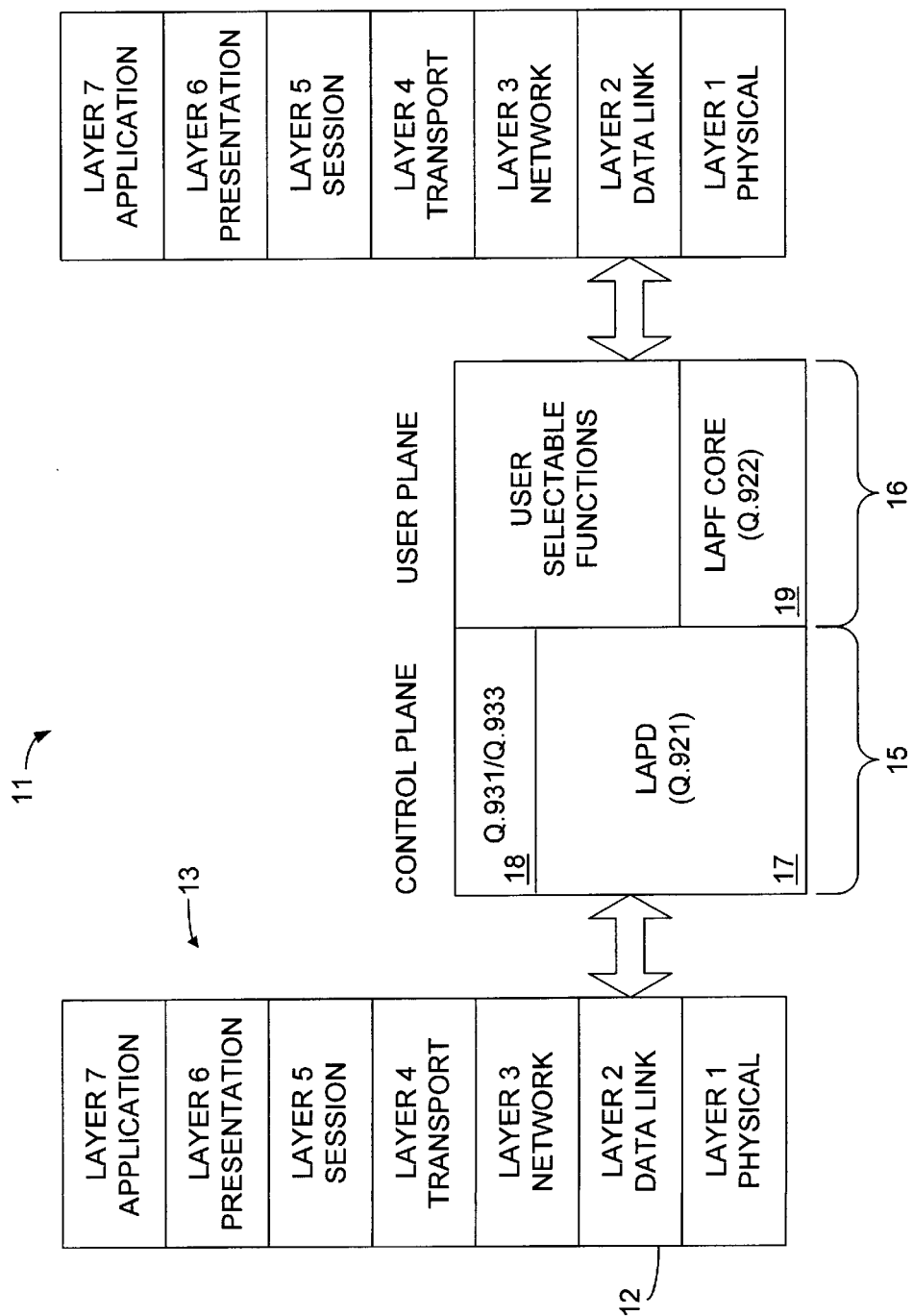
FIG. 1 is a block diagram of a network model illustrating the framework within which the present invention resides.

Referring now to FIG. 1, shown is a block diagram of a network model 11 illustrating the framework within which the present invention resides. The present invention substantially resides at layer 2, or the data link layer 12, of the OSI seven layer model 13. Contained at the data link layer 12 are the standards and protocols that enable the transport of frame relay data over the ISDN. The protocol architecture that supports frame relay transport can be considered to reside in two planes of operation. The control plane 15 and the user plane 16. The control plane allows signaling to control the establishment and termination of transportation services on the user plane. At the data link layer 12, LAPD (Q.921) (Link Access Procedure on the D channel) 17 20 is used to provide a reliable data link control service with error control and flow control. This data link control service is used for the exchange of Q.931/Q.933 control signaling messages 18. For the transfer of information between end users, the user plane 16 protocol is LAPF (Q.922) (Link Access Procedure for Frame-Mode Bearer Services) 19. The protocol Q.922, among other things, includes an address header that is applied to a data packet and provides the addressing for the frame relay packet.

Figure 2:
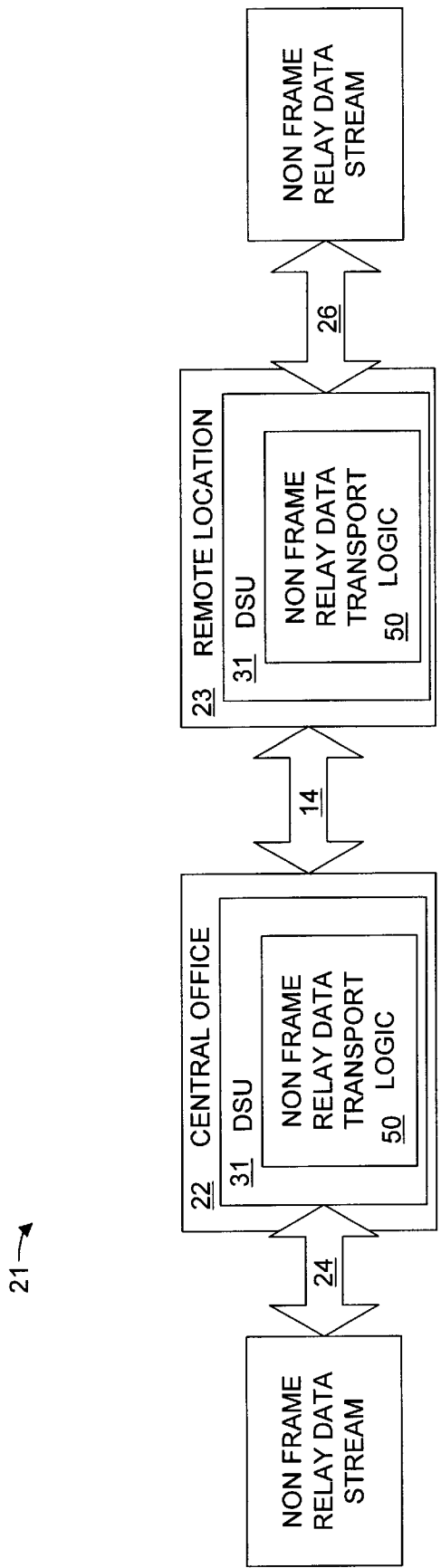
FIG. 2 is a schematic view illustrating a communication environment in which devices containing the non frame relay data transport logic operate.

Referring now to FIG. 2, shown is a communications environment 21 in which communications devices containing the non frame relay data transport logic of the present invention operate. Both central office location 22 and remote location 23 contain communication devices 31. Communications device 31 can be, for example but not limited to, a data service unit (DSU), modem, or any other communication device capable of frame relay communication. In the preferred embodiment, communication device 31 is a DSU, which contains non frame relay data transport logic 50. DSU 31 at central office 22 and DSU 31 at remote location 23 are connected to non frame relay data sources that are represented by blocks labeled "non frame relay data stream" in order to indicate that any non frame relay communication packet can be transported by the non frame relay transport logic of the present invention. Interface 24 located at central office 22 and interface 26 located at remote location 23 connect the respective DSU's 31 to the non frame relay data stream. Central office location 22 is typically the local telephone companies' local exchange office which connects via copper wire pair 14 to a remote customer location 23, which can be for example a residential or business location. While the preferred embodiment will discuss the non frame relay data transport logic 50 as residing within a DSU, in fact any communications device may employ the non frame relay data transport logic 50 to compress and transport non frame relay data over a frame relay network.

Figure 3:
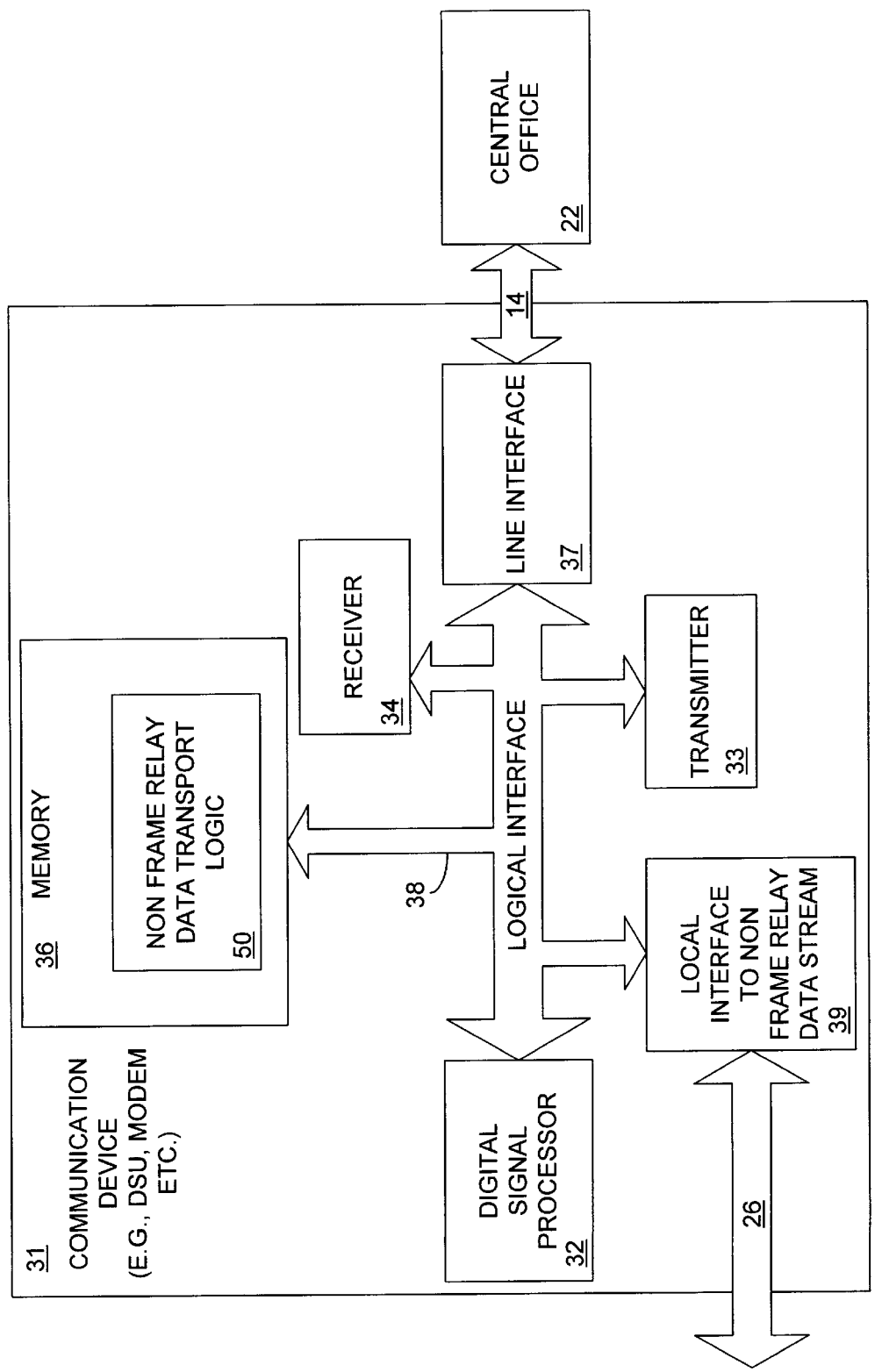
FIG. 3 is a block diagram illustrating a communications device containing the non frame relay data transport logic of the present invention.

Referring now to FIG. 3, shown is a schematic view illustrating a communications device, for example but not limited to, a data service unit (DSU) containing the non frame relay data transport logic 50. DSU 31 contains conventional components as is known in the art of data communications. Digital signal processor (DSP) 32 controls the operation of the DSU's transmitter 33 and receiver 34 through logical interface 38, and couples to line interface 37 to gain access to communication channel 14, which in turn connects to central office 22. Communication channel 14 is typically the copper wire pair that extends from a remote user location, such as a residence or business location, to a telephone company central office communication network, in the preferred embodiment a frame relay network. However, communication channel 14 can be any medium for connecting the remote communication device, or DSU 31, to a central location. Also included in DSU 31 is memory 36 which includes non frame relay data transport logic 50 of the present invention, and local interface 39 to non frame relay data stream. Local interface 39 provides non frame relay local equipment, i.e., the non frame relay data stream of FIG. 2, access to DSU 31 over connection 26. While connection 26 is illustrated as connecting DSU 31 located at remote location 23 to non frame relay data stream, DSU 31 located at central office 22 can connect over connection 24 as well. Non frame relay data transport logic 50 is configured to enable and drive DSP 32 to allow the segmentation, identification, compression, and transport of non frame relay data packets over a frame relay communication network.

Figure 4:
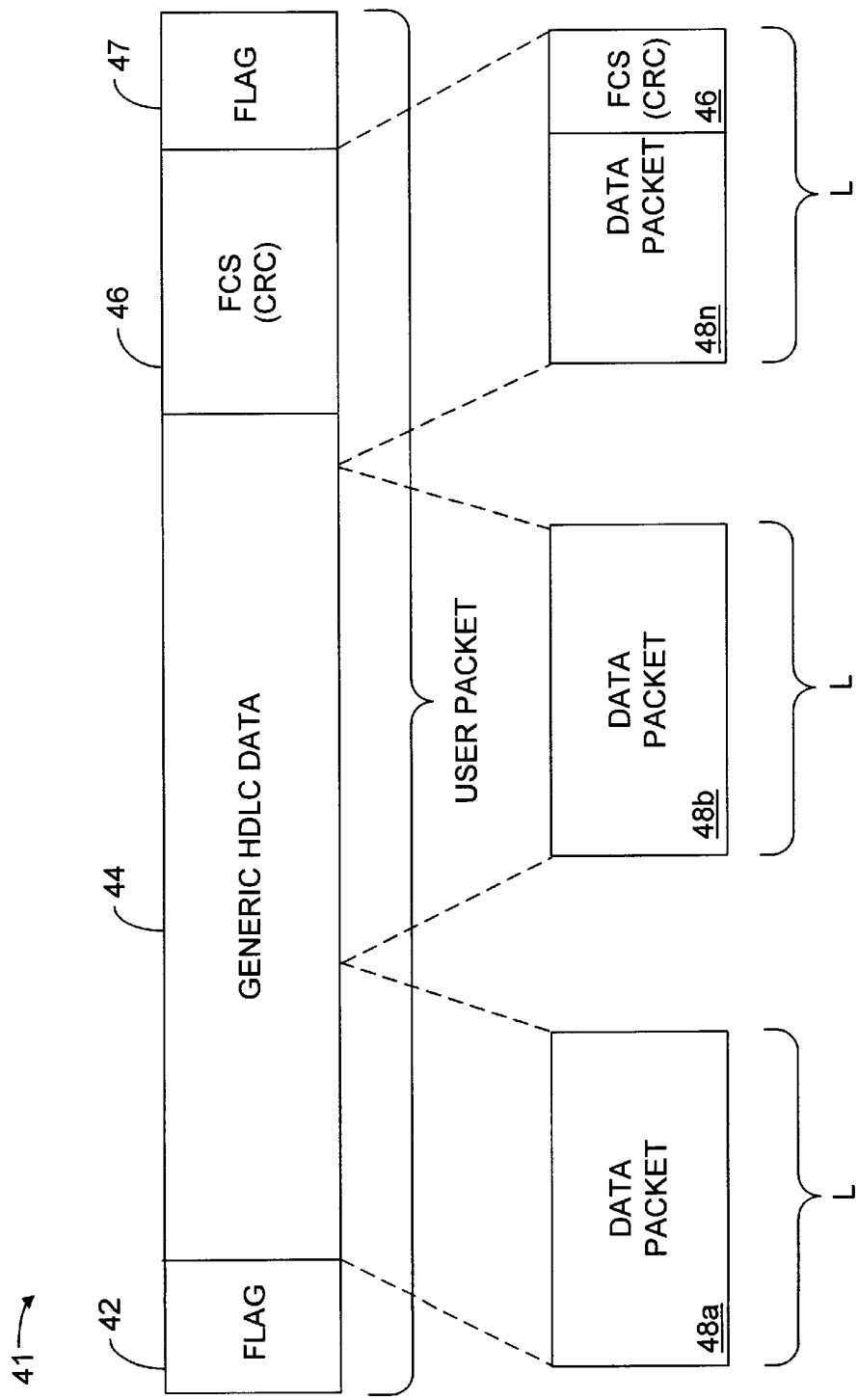
FIG. 4 is a schematic view illustrating a generic HDLC communications packet as operated upon by the non frame relay data transport logic of FIG. 3.

With reference now to FIG. 4, shown is a schematic view illustrating a High Level Data Link Control (HDLC) communications packet 41 operated upon by non frame relay data transport logic 50 of FIG. 3. Packet 41 is illustrated as a standard HDLC communication packet, i.e., a non frame relay communication packet and can be any non frame relay communication packet. Begin flag 42 signals the start of the packet. Frame 44 is a generic HDLC data frame and in this preferred embodiment is 10,000 octets in length, however, it can be any number of octets in length. An octet is an eight bit word. Following generic HDLC data frame 44 is frame check sequence (FCS) frame 46. The FCS frame is typically two octets in length and is typically a cyclical redundancy check (CRC) error detection code used to ensure the integrity of the transported information. Finally, frame 47 contains the one octet end flag used to signal the end of the packet. Generic HDLC data frame 44 and FCS frame 46 are segmented by the non frame relay data transport logic of the present invention into a plurality of data packets 48, or segments of length "L". The length of each data packet 48 is variable based upon the requirements of the particular application. Each data packet 48 is filled with raw data from generic HDLC data frame 44. The final data packet 48n also contains FCS frame 46. In some instances, final data packet 48n may only contain FCS frame 46.

Figure 5:
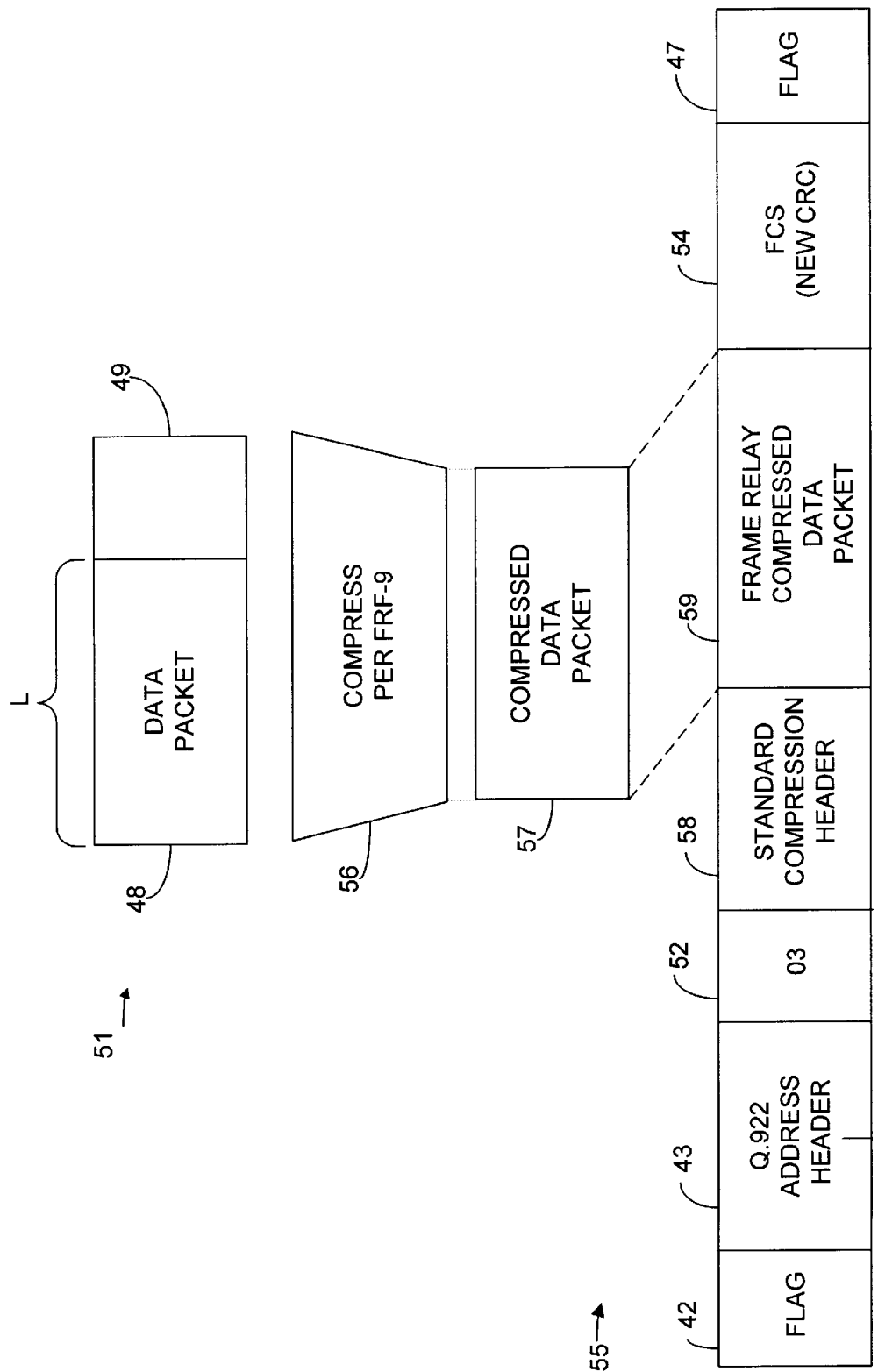
FIG. 5 is a schematic view illustrating a communication packet of FIG. 4 as operated upon by the non frame relay data transport logic of FIG. 3.

Referring now to FIG. 5, shown is a schematic view illustrating a data packet 48 as operated upon by the non frame relay data transport logic of the present invention. Data packet 48 has segmentation field 49 appended thereto. Segmentation field 49 defines the position of data packet 48 in the sequence that was created by segmenting generic HDLC data frame 44 into a plurality of data packets 48. Segmentation field 49 may contain a sequence number, a bit field to indicate for example start, middle or end, or any other method to identify the position in the sequence of the particular data packet. This enables the order of delivery of data packets 48 to be controlled. Packet 51, which includes data packet 48 and segmentation field 49 is then compressed in accordance with Frame Relay Forum standard 9 (FRF-9) 56. FRF-9 is the data compression over frame relay implementation agreement, as published by the frame relay forum technical committee on Jan. 22, 1996 and is known in the art. Note that FCS frame 46, which contains the user packet check sum, is compressed in its entirety in the last data packet 48n. Compressed data packet 57 is now available to be encapsulated for transport over a standard frame relay network. The following detailed description explains the encapsulation of compressed packet 57 in accordance with FRF-9, however other standard encapsulations may be used. Once encapsulated, compressed data packet 57, which contains information from non frame relay packet 41, becomes frame relay compressed data packet 59, and can be transported over a frame relay network, thus making the transport of non frame relay data transparent to the frame relay network.

Flag header 42 is followed by the Q.922 address header in frame 43 and is depicted as two octets. Frame 43 can be a length of two to four octets, however, for simplicity is shown as two octets in the preferred embodiment. Following frame 43 is frame 52, which is the Unnumbered Interface control field and is of standard HDLC value "03". The Unnumbered Information (UI) control field is defined in Internet Engineering Task Force (IETF) Request for Comment (RFC)-1490. The compression and transport of standard frame relay traffic is defined in FRF-9. FRF-9 defines the compression and transport of standard IETF frames with a UI control field. Following UI control field 52 is standard compression header 58.

Figure 6:
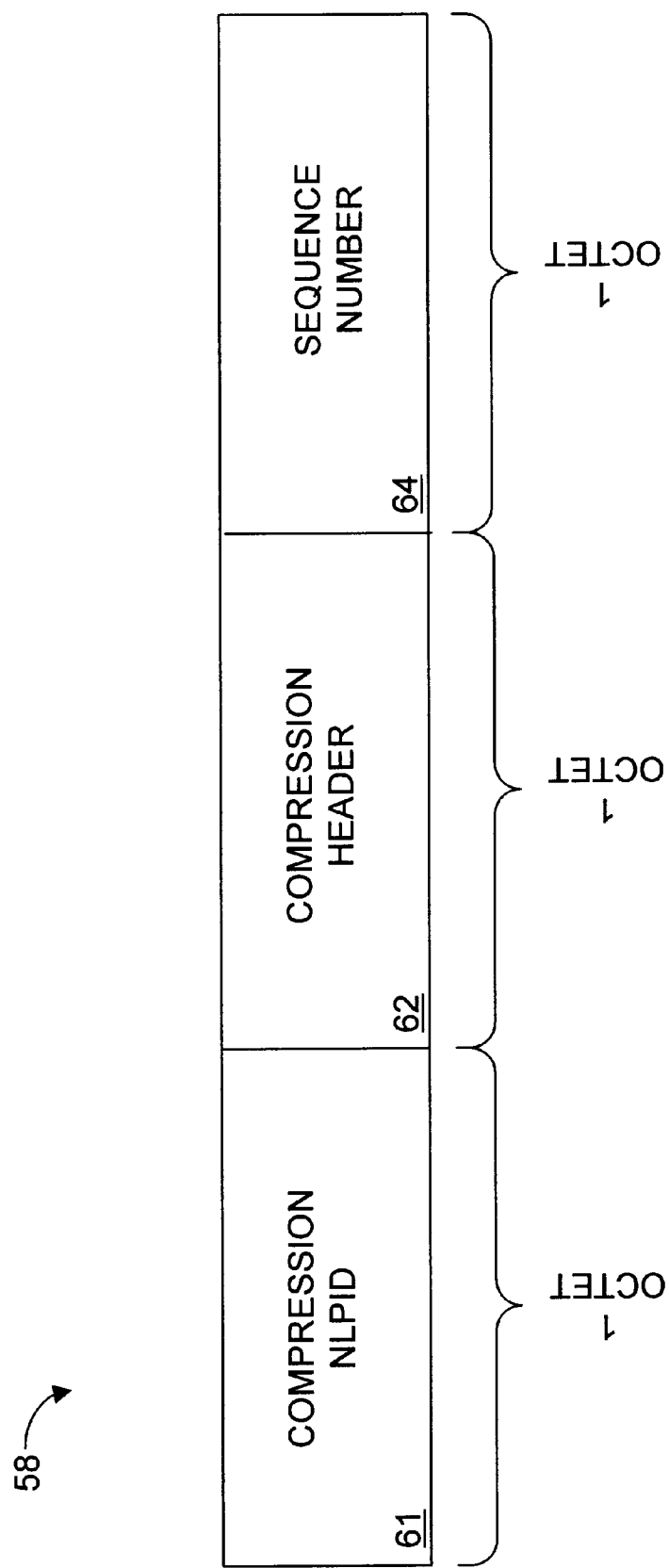
FIG. 6 is a schematic view of a standard compression header of the communication packet of FIG. 5.

Referring now to FIG. 6, shown is standard FRF-9 compression header 58 of the communication packet of FIG. 5. Compression header 58 is comprised of three frames of one octet each. Compression NLPID field 61 is the network layer protocol identification that FRF-9 defines for compressed packets. Field 62 is the compression header and field 64 is the sequence number. FRF-9 provides for a sequence number field so that the decompressor can identify whether a packet is lost.

Referring back to FIG. 5, following standard compression header 58 is frame relay compressed data packet 59. After compression and encapsulation, a new FCS cyclic redundancy check (CRC) frame 54 is generated and applied as a trailer, thus ensuring that the integrity of each frame relay compressed data packet 59 can be verified after transport across the network. Frame 47 contains the flag that signals the end of communications packet 55.

The packet is now ready to be transported over a frame relay communications path.

Figure 7:
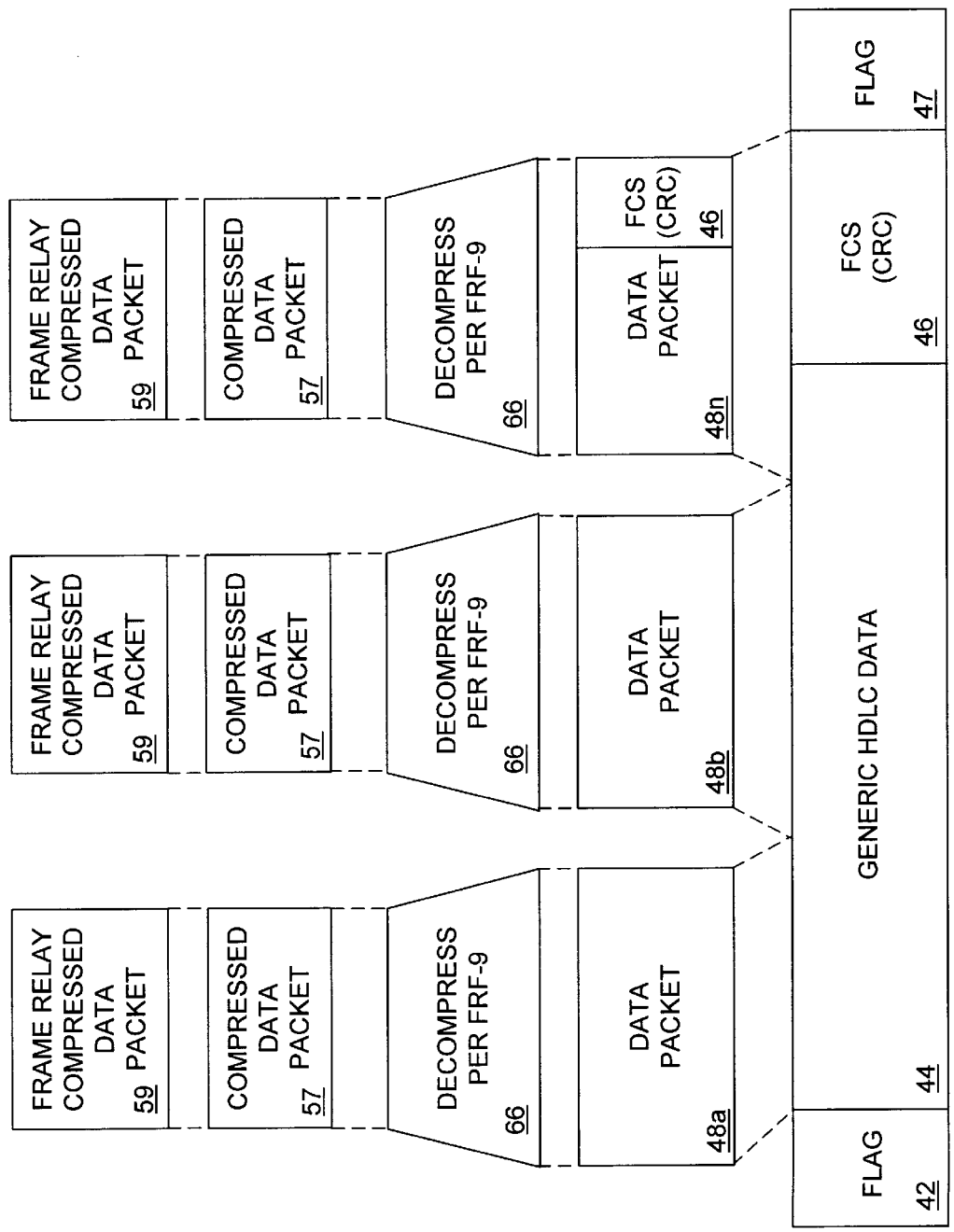
FIG. 7, is a schematic view illustrating a received communication packet of FIG. as operated upon by the non frame relay data transport logic of FIG. 3.

Referring now to FIG. 7, shown is a schematic view illustrating a series of received frame relay compressed data packets 59 of FIG. 5 as operated upon by the non frame relay data transport logic 50. The FCS frame 54 of FIG. 5 is verified and removed. Then, the standard compression header 58, UI control field 52, and Q.922 address header 43, all of FIG. 5, are removed resulting in compressed data packet 57. Compressed data packet 57 is then decompressed 66 in accordance with FRF-9 resulting in original data packet 48. Original data packets 48 are then reassembled into generic HDLC data frame 44 for presentation. Note that the original user check sum FCS frame 46 that was compressed within final data packet 48n remains intact, thus ensuring that the reassembled frame 44 is identical to the original frame presented to the non frame relay compression logic 50.

Figure 8:
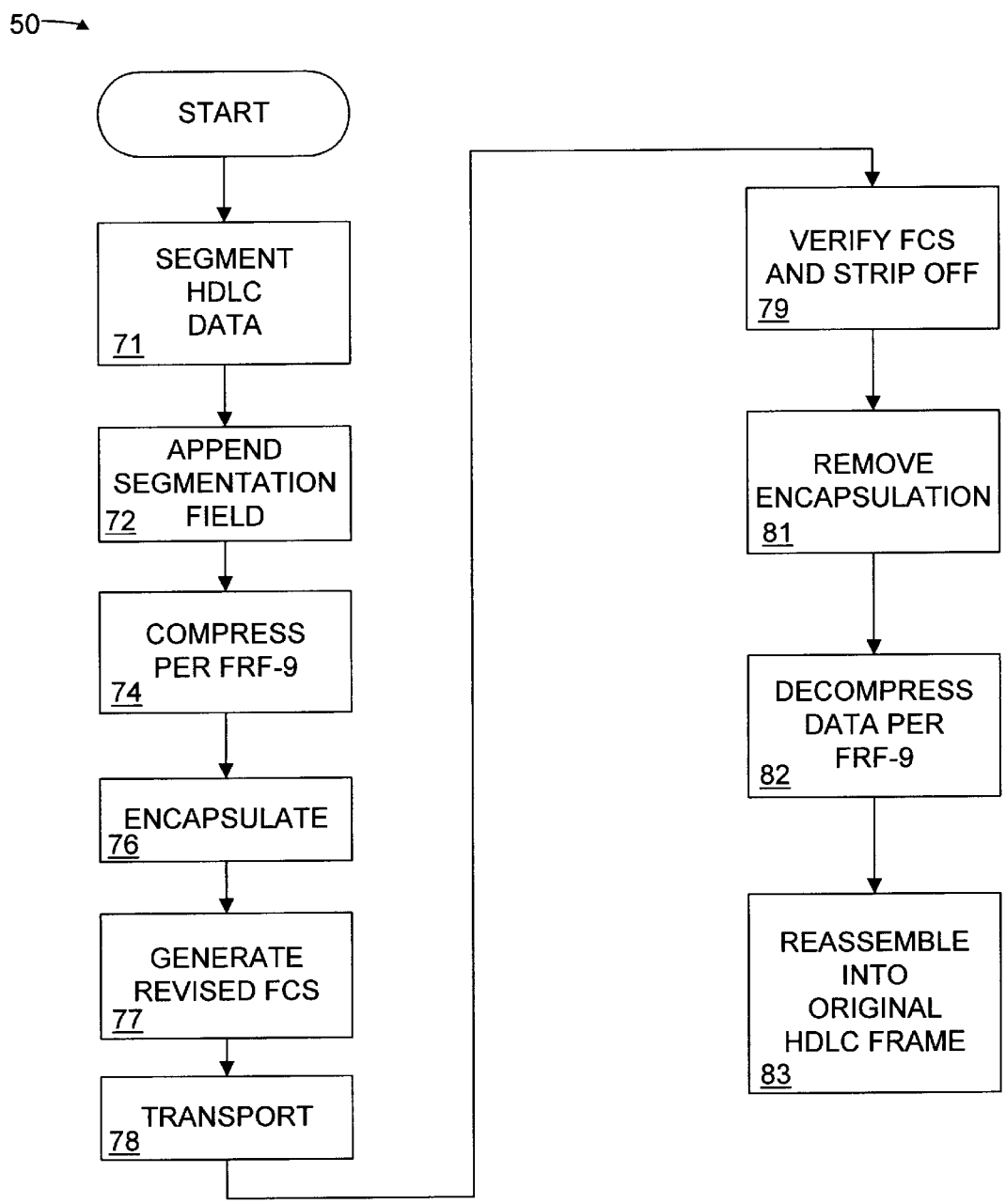
FIG. 8 is a flowchart illustrating the architecture, functionality, and operation of the non frame relay data transport logic of FIG. 3.

Referring now to FIG. 8, shown by way of flowchart is the non frame relay data transport logic 50 (FIG. 3) of present invention. Block 71 segments the generic HDLC data frame 44 of FIG. 4 into a plurality of data packets 48. Each data packet is filled with a segment of data from frame 44 until all data from frame 44 is packetized into packets 48 of length "L". The length of packets 48 is variable depending upon the desired application. The final data packet, 48n, includes the user packet check sum, or FCS frame 46. In some instances final data packet 48n contains only FCS frame 46, such as when the last segment of data from generic HDLC frame 44 completely fills a data packet 48. Block 72 appends segmentation field 49 to each data packet 48. Segmentation field 49 defines the position of the particular data packet 48 in the sequence that was created by segmenting generic HDLC frame 44, thus ensuring accurate reassembly of the original generic HDLC packet 44 upon decompression, and enabling the order of delivery of data packets 48 to be controlled. Block 74 compresses data packet 48 in accordance with FRF-9 into compressed data packet 57. FRF-9 is the data compression over frame relay implementation agreement as is known in the art In the preferred embodiment, block 76 encapsulates compressed data packet 57 with standard frame relay compression header 58, UI control field 52 and Q.922 address header 43 as shown in FIG. 5, allowing compressed data packet 57 to be transported over the frame relay network as frame relay compressed data packet 59. Block 77 generates a revised frame check sequence frame 54 for each frame relay compressed data packet 59. Packet 59 now resembles a standard frame relay communication packet and can be transparently transported over a frame relay network by block 78. At a receiving device, block 79 verifies and removes the revised FCS frame 54. Block 81 removes the standard encapsulation frames, i.e., standard compression header 58, UI control field 52, and Q.922 address header 43 from frame relay compressed data packet 59 resulting in compressed data packet 57. Block 82 decompresses the compressed data packet 57 per FRF-9. Block 83 reassembles each decompressed original data packet 48 into the original HDLC data frame 44 using segmentation field 49 to ensure the correct order of original data packets 48. The original user check sum FCS frame 46 that was included in the final data packet 48n is also decompressed with the data in data packet 48n, thus ensuring integrity of the data transported generic HDLC frame 44.

It will be obvious to those skilled in the art that many modifications and variations may be made to the preferred embodiments of the present invention, as set forth above, without departing substantially from the principles of the present invention. For example, while illustrated with respect to compression per FRF-9, the principles of the present invention are applicable to various other compression or encryption standards. All such modifications and variations are intended to be included herein within the scope of the present invention, as defined in the claims that follow.

What is claimed is:

1. A system for efficiently compressing and transporting a non frame relay communications packet over a frame relay network, comprising:

means for segmenting a generic data frame into a plurality of data segments;

means for adding a segmentation field to each of said plurality of data segments;

means for compressing each of said plurality of data segments to form a plurality of compressed data segments;

means for encapsulating each of said plurality of compressed data segments to form a plurality of compressed frame relay data packets;

means for transporting each of said plurality of compressed frame relay data packets over a frame relay communications network;

means for receiving each of said plurality of compressed frame relay data packets;

means for decompressing each of said plurality of compressed frame relay data packets to form a plurality of decompressed data segments; and means for reassembling each of said plurality of decompressed data segments into said generic data frame.

2. The system of claim 1, wherein each of said plurality of data segments is of length "L".

3. The system of claim 1, wherein a user check sum is compressed in the last one of said plurality of data segments.

4. A system for efficiently compressing and transporting a non frame relay communications packet over a frame relay network, comprising:

logic configured to segment a generic data frame into a plurality of data segments;

logic configured to add a segmentation field to each of said plurality of data segments;

logic configured to compress each of said plurality of data segments to form a plurality of compressed data segments;

logic configured to encapsulate each of said plurality of compressed data segments to form a plurality of compressed frame relay data packets;

logic configured to transport each of said plurality of compressed frame relay data packets over a frame relay communications network;

logic configured to receive each of said plurality of compressed frame relay data packets;

logic configured to decompress each of said compressed frame relay data packets to form a plurality of decompressed data segments; and logic configured to reassemble each of said decompressed data segments into said generic data frame.

5. The system of claim 4, wherein each of said plurality of data segments is of length "L".

6. The system of claim 4, wherein a user check sum is compressed in the last one of said plurality of data segments.

7. A method for efficiently compressing and transporting a non frame relay communications packet over a frame relay network, comprising the steps of:

segmenting a generic data frame into a plurality of data segments;

adding a segmentation field to each of said plurality of data segments;

compressing each of said plurality of data segments to form a plurality of compressed data segments;

encapsulating each of said plurality of compressed data segments to form a plurality of compressed frame relay data packets;

transporting each of said plurality of compressed frame relay data packets over a frame relay communications network;

receiving each of said plurality of compressed frame relay data packets;

decompressing each of said compressed frame relay data packets to form a plurality of decompressed data segments; and reassembling each of said decompressed data segments into said generic data frame.

8. The method of claim 7, wherein each of said plurality of data segments is of length "L".

9. The method of claim 7, wherein a user check sum is compressed in the last one of said plurality of data segments.

10. A system for efficiently compressing and transporting a non frame relay communications packet over a frame relay network, comprising:

means for segmenting a generic data frame into a plurality of data segments;

means for adding a segmentation field to each of said plurality of data segments;

means for compressing each of said plurality of data segments to form a plurality of compressed data segments;

means for encapsulating each of said plurality of compressed data segments to form a plurality of compressed frame relay data packets; and means for transporting each of said plurality of compressed frame relay data packets over a frame relay communications network.

11. The system of claim 10, wherein each of said plurality of data segments is of length "L".

12. The system of claim 10, wherein a user check sum is compressed in the last one of said plurality of data segments.

13. A system for efficiently decompressing a non frame relay communications packet over a frame relay network, comprising:

means for receiving a plurality of compressed frame relay data packets, each of said compressed frame relay data packets associated with a segmentation field;

means for decompressing each of said compressed frame relay data packets to form a plurality of decompressed data segments; and means for reassembling each of said decompressed data segments into a generic data frame.

14. The system of claim 13, further comprising:

means for generating a revised frame check sequence based upon said compressed data segment.

15. A system for efficiently compressing and transporting a non frame relay communications packet over a frame relay network, comprising:

logic configured to segment a generic data frame into a plurality of data segments;

logic configured to add a segmentation field to each of said plurality of data segments;

logic configured to compress each of said plurality of data segments to form a plurality of compressed data segments;

logic configured to encapsulate each of said plurality of compressed data segments to form a plurality of compressed frame relay data packets; and logic configured to transport each of said plurality of compressed frame relay data packets over a frame relay communications network.

16. The system of claim 15, wherein each of said plurality of data segments is of length "L".

17. The system of claim 15, wherein a user check sum is compressed in the last one of said plurality of data segments.

18. A system for efficiently decompressing a non frame relay communications packet over a frame relay network, comprising:

logic configured to receive a plurality of compressed frame relay data packets, each of said compressed frame relay data packets associated with a segmentation field;

logic configured to decompress each of said compressed frame relay data packets to form a plurality of decompressed data segments; and logic configured to reassemble each of said decompressed data segments into a generic data frame.

19. The system of claim 18, further comprising:

logic configured to generate a revised frame check sequence based upon said compressed data segment.

20. A method for efficiently compressing and transporting a non frame relay communications packet over a frame relay network, comprising the steps of:

segmenting a generic data frame into a plurality of data segments;

adding a segmentation field to each of said plurality of data segments;

compressing each of said plurality of data segments to form a plurality of compressed data segments;

encapsulating each of said plurality of compressed data segments to form a plurality of compressed frame relay data packets; and transporting each of said plurality of compressed frame relay data packets over a frame relay communications network.

21. The method of claim 20, wherein each of said plurality of data segments is of length "L".

22. The method of claim 20, wherein a user check sum is compressed in the last one of said plurality of data segments.

23. A method for efficiently decompressing a non frame relay communications packet over a frame relay network, comprising the steps of:

receiving a plurality of compressed frame relay data packets, each of said compressed frame relay data packets associated with a segmentation field;

decompressing each of said compressed frame relay data packets to form a plurality of decompressed data segments; and reassembling each of said decompressed data segments into a generic data frame.

24. The method of claim 23, further comprising the step of:

generating a revised frame check sequence based upon said compressed data segment.

25. A computer readable medium having a program for efficiently compressing and transporting a non frame relay communications packet over a frame relay network, the program comprising:

logic configured to segment a generic data frame into a plurality of data segments;

logic configured to add a segmentation field to each of said plurality of data segments;

logic configured to compress each of said plurality of data segments to form a plurality of compressed data segments;

logic configured to encapsulate each of said plurality of compressed data segments to form a plurality of compressed frame relay data packets;

logic configured to transport each of said plurality of compressed frame relay data packets over a frame relay communications network;

logic configured to receive each of said plurality of compressed frame relay data packets;

logic configured to decompress each of said compressed frame relay data packets to form a plurality of decompressed data segments; and logic configured to reassemble each of said decompressed data segments into said generic data frame.

26. The program of claim 25, wherein each of said plurality of data segments is of length "L".

27. The program of claim 25, wherein a user check sum is compressed in the last one of said plurality of data segments.

28. A computer readable medium having a program for efficiently compressing and transporting a non frame relay communications packet over a frame relay network, the program comprising:

logic configured to segment a generic data frame into a plurality of data segments;

logic configured to add a segmentation field to each of said plurality of data segments;

logic configured to compress each of said plurality of data segments to form a plurality of compressed data segments;

logic configured to encapsulate each of said plurality of compressed data segments to form a plurality of compressed frame relay data packets; and logic configured to transport each of said plurality of compressed frame relay data packets over a frame relay communications network.

29. The program of claim 28, wherein each of said plurality of data segments is of length "L".

30. The program of claim 28, wherein a user check sum is compressed in the last one of said plurality of data segments.

31. A computer readable medium having a program for efficiently decompressing a non frame relay communications packet over a frame relay network, the program comprising:

logic configured to receive a plurality of compressed frame relay data packets, each of said compressed frame relay data packets associated with a segmentation field;

logic configured to decompress each of said compressed frame relay data packets to form a plurality of decompressed data segments; and logic configured to reassemble each of said decompressed data segments into a generic data frame.

32. The program of claim 31, further comprising:

logic configured to generate a revised frame check sequence based upon said compressed data segment.

* * * * *

UNITED STATES PATENT AND TRADEMARK OFFICE
CERTIFICATE OF CORRECTION

PATENT NO. : 6,134,245
DATED : October 17, 2000
INVENTOR(S) : Scarmalis

It is certified that error appears in the above-identified patent and that said Letters Patent is hereby corrected as shown below:

Column 1, lines 34-35, after the word "OSI" delete the phrase "seven layer", and substitute therefor --seven-layer--.

Column 2, line 26, after the word "OSI" delete the phrase "seven later", and substitute therefor --seven-layer--.

Column 5, line 7, after the word "FIG." add the numeral --5--.

Column 5, lines 43-44, after the word "OSI", delete the phrase "seven layer", and substitute therefor --seven-layer--.

Column 5, line 52, after the numeral "17", delete the numeral "20".

Column 5, line 65, after the word "invention", delete the word "operate", and substitute therefor --operates--.

Column 6, line 43, after the numeral "2,", add the word --and--.

Column 7, line 20, after the numral "49", add the symbol --,--.

Column 8, line 40, after the word "art", add the symbol --.--.

Column 10, line 60, after the word "upon", delete the word "said", and substitute therefor --a--.

Column 11, line 28, after the word "upon", delete the word "said", and substitute therefor --a--.

UNITED STATES PATENT AND TRADEMARK OFFICE
CERTIFICATE OF CORRECTION

PATENT NO. : 6,134,245
DATED : October 17, 2000
INVENTOR(S) : Scarmalis

It is certified that error appears in the above-identified patent and that said Letters Patent is hereby corrected as shown below:

Column 11, lines 62-63, after the word "upon", delete the word "said", and substitute therefor --a--.

Column 12, line 65, after the word "upon", delete the word "said", and substitute therefor --a--.

Signed and Sealed this

Eighth Day of May, 2001

*Attest:*

NICHOLAS P. GODICI

*Attesting Officer*    Acting Director of the United States Patent and Trademark Office